(12) United States Patent
Rieger et al.

(10) Patent No.: US 9,206,774 B2
(45) Date of Patent: Dec. 8, 2015

(54) COWL-MOUNTED AIR CLEANER

(71) Applicant: MANN+HUMMEL GMBH, Ludwigsburg (DE)

(72) Inventors: Mario Rieger, Freiberg (DE); Michael Willig, Seattle, WA (US); Michael A. Martin, Nashville, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 16 days.

(21) Appl. No.: 14/145,518

(22) Filed: Dec. 31, 2013

(65) Prior Publication Data

US 2015/0184623 A1 Jul. 2, 2015

(51) Int. Cl.
| | |
|---|---|
| *B60K 11/08* | (2006.01) |
| *F02M 35/02* | (2006.01) |
| *F02M 35/022* | (2006.01) |
| *F02M 35/024* | (2006.01) |
| *B60K 13/02* | (2006.01) |

(52) U.S. Cl.
CPC ............ *F02M 35/0212* (2013.01); *B60K 13/02* (2013.01); *F02M 35/0223* (2013.01); *F02M 35/02483* (2013.01)

(58) Field of Classification Search
CPC ........ B60K 11/00; B60K 11/02; B60K 11/04; B60K 11/08
USPC ................................. 180/68.1–68.5
See application file for complete search history.

(56) References Cited

U.S. PATENT DOCUMENTS 7,905,936 B2 * 3/2011 Coulonvaux et al. ........... 55/357
2009/0064647 A1 3/2009 Darnell

* cited by examiner

Primary Examiner — John Walters
Assistant Examiner — James Triggs
(74) Attorney, Agent, or Firm — James Hasselbeck

(57) ABSTRACT

An air cleaner assembly may include a filter element and an outer housing. The outer housing may define an interior volume in which the filter element is disposed. The outer housing may include a curved sheet and a planar sheet and extending between ends of the curved sheet. The curved sheet may define an air inlet of the interior volume. The planar sheet may define an air outlet of the interior volume.

14 Claims, 4 Drawing Sheets

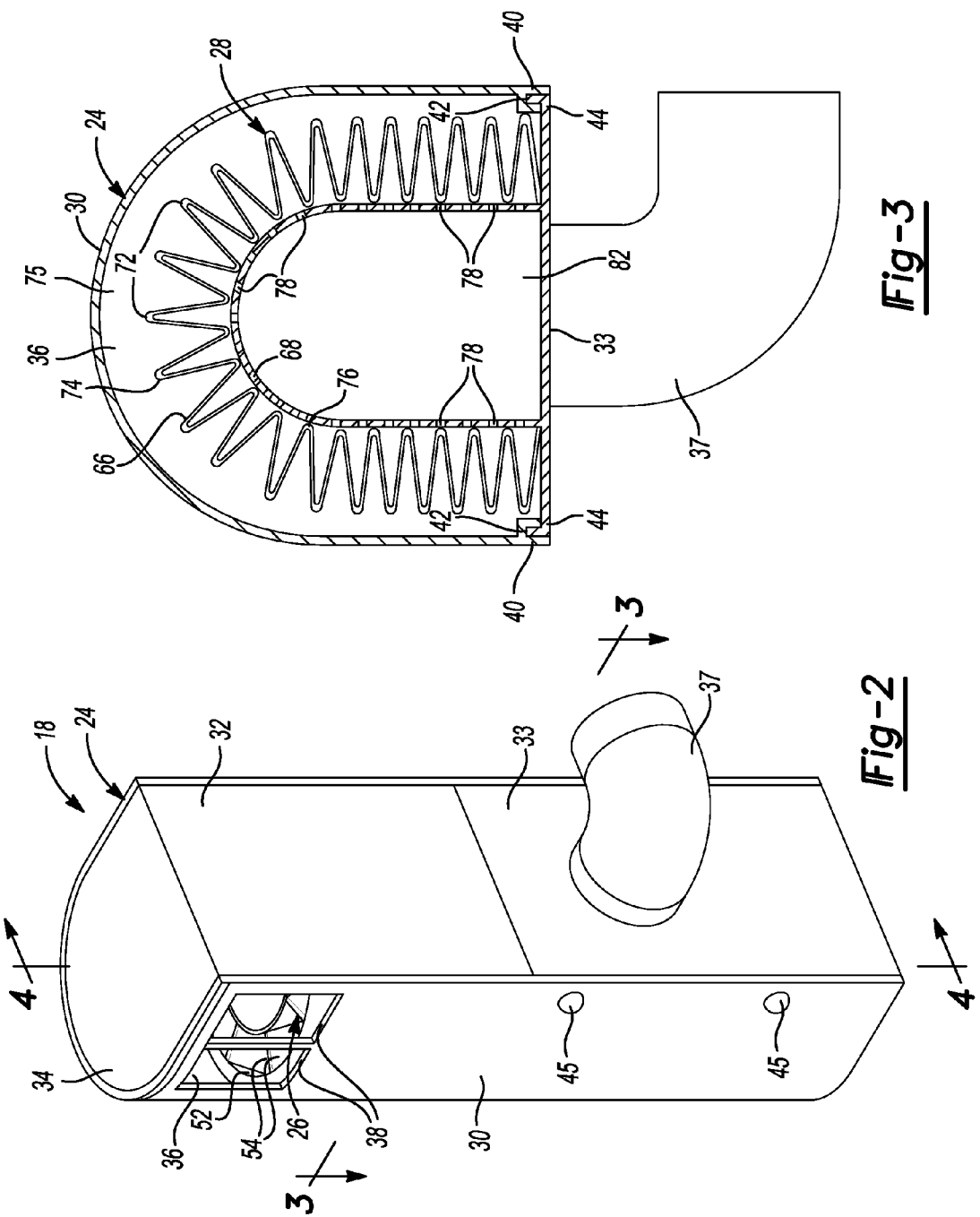

COWL-MOUNTED AIR CLEANER

FIELD

The present disclosure relates to an air cleaner for a vehicle, and more particularly, to an externally mounted air cleaner.

BACKGROUND

This section provides background information related to the present disclosure and is not necessarily prior art.

Vehicles such as semi-trucks and other commercial or construction vehicles, for example, may include an externally mounted air cleaner. The air cleaner may include a filter element to filter dirt, dust and/or other particulate matter from air received therein. Clean air may exit the filter element and be directed into an air intake manifold of an engine of the vehicle.

SUMMARY

This section provides a general summary of the disclosure, and is not a comprehensive disclosure of its full scope or all of its features.

In one form, the present disclosure provides an air cleaner assembly that may include a filter element and an outer housing. The outer housing may define an interior volume in which the filter element is disposed. The outer housing may include a curved sheet formed from a metallic material and a planar sheet (and/or another curved sheet) formed from a polymeric material and extending between ends of the curved sheet. The curved sheet may define an air inlet of the interior volume. The planar sheet may define an air outlet of the interior volume.

In some embodiments, the filter element may include a U-shaped cross section.

In some embodiments, the curved sheet may include a U-shaped cross section.

In some embodiments, the air cleaner assembly may include an outlet tube extending from the planar sheet.

In some embodiments, the air inlet may include a plurality of openings formed in the curved sheet.

In some embodiments, the air cleaner assembly may include a polymeric end sheet that is substantially perpendicular to the curved sheet and the planar sheet and attached to the curved sheet and the planar sheet.

In some embodiments, the air cleaner assembly may include a curved support member and an end cap. The support member may be disposed within the outer housing and may support the filter element. The end cap may be disposed within the outer housing and may be directly attached to an axial end of the filter element and an axial end of the support member. The planar polymeric sheet may be integrally formed with the support member and the end cap.

In some embodiments, the air cleaner assembly may include a cyclonic dust separator disposed within the outer housing between the air inlet and the filter element.

In another form, the present disclosure provides an air cleaner assembly that may include a U-shaped filter element and an outer housing. The outer housing may define an interior volume in which the filter element is disposed. The outer housing may include a U-shaped sheet and a planar sheet extending between ends of the U-shaped sheet. The U-shaped sheet may define an air inlet of the interior volume. The planar sheet may define an air outlet of the interior volume.

In some embodiments, the planar sheet may be formed from a polymeric material.

In some embodiments, the U-shaped sheet may be formed from a metallic material.

In some embodiments, the air cleaner assembly may include a polymeric end sheet that is substantially perpendicular to the U-shaped sheet and the planar sheet and attached to the U-shaped sheet and the planar sheet.

In some embodiments, the air cleaner assembly may include an outlet tube extending from the planar sheet.

In some embodiments, the air inlet may include a plurality of openings formed in the U-shaped sheet.

In some embodiments, the air cleaner assembly may include a U-shaped support member and an end cap. The support member may be disposed within the outer housing and may support the filter element. The end cap may be disposed within the outer housing and may be directly attached to an axial end of the filter element and an axial end of the support member. The planar polymeric sheet may be integrally formed with the support member and the end cap.

In some embodiments, the air cleaner assembly may include a cyclonic dust separator disposed within the outer housing between the air inlet and the filter element.

In another form, the present disclosure provides a vehicle that may include a vehicle body, an engine and an air cleaner. The vehicle body may define an engine compartment. The engine may be disposed within the engine compartment. The air cleaner may be mounted to an exterior of the vehicle body and may be in fluid communication with the engine. The air cleaner may include a U-shaped filter element and an outer housing defining an interior volume in which the filter element is disposed. The outer housing may include a U-shaped sheet and a planar polymeric sheet. The U-shaped sheet may be formed at least partially from a metallic material. The planar polymeric sheet may extend between ends of the U-shaped sheet. The U-shaped sheet may define an air inlet of the interior volume. The planar polymeric sheet may define an air outlet fluidly coupled with the engine.

In some embodiments, the outer housing may include a polymeric end sheet that is substantially perpendicular relative to the U-shaped sheet and the planar polymeric sheet and attached to U-shaped sheet and the planar polymeric sheet.

In some embodiments, the air cleaner may include a U-shaped support member and an end cap. The support member may be disposed within the outer housing and may support the filter element. The end cap may be disposed within the outer housing and may be directly attached to an axial end of the filter element and an axial end of the support member. The planar polymeric sheet may be integrally formed with the support member and the end cap.

In some embodiments, the air cleaner may include a cyclonic dust separator disposed within the outer housing between the air inlet and the filter element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of the air cleaner of FIG. 1;

FIG. 3 is a cross-sectional view of the air cleaner taken along line 3-3 of FIG. 2;

Corresponding reference numerals indicate corresponding parts throughout the several views of the drawings.

DETAILED DESCRIPTION

Example embodiments will now be described more fully with reference to the accompanying drawings.

Figure 1:
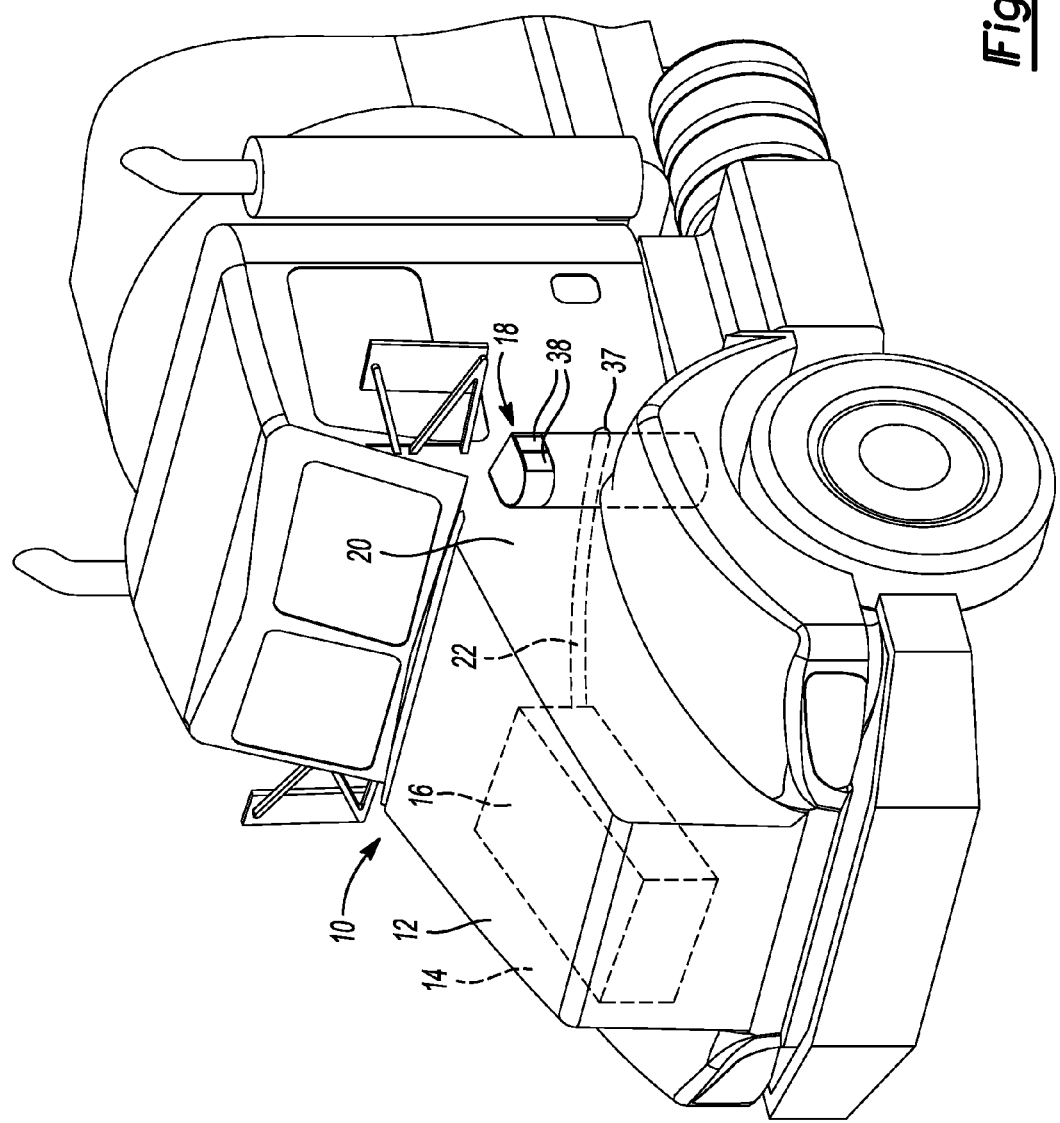
FIG. 1 is a partial perspective view of a vehicle having an externally mounted air cleaner according to the principles of the present disclosure.

With initial reference to FIG. 1, an exemplary vehicle 10 is illustrated that is shown to generally include a vehicle body 12 defining an engine compartment 14 in which an engine 16 may be disposed. An air cleaner assembly 18 in accordance with the present teachings may be mounted to an exterior surface 20 of the vehicle body 12 and may provide air to combustion chambers (not shown) of the engine 16 via an air-induction conduit 22. In some embodiments, the vehicle 10 may include more than one air cleaner assembly 18 providing air to the combustion chambers of the engine 16.

With continued reference to FIG. 1 and additional reference to FIGS. 2-5, the air cleaner 18 of the present teachings will be further described. The air cleaner assembly 18 may include an outer housing 24, a dust separator 26, and a filter assembly 28. The outer housing 24 may include a curved or generally U-shaped sheet 30, a planar first back sheet 32, a planar second back sheet 33, a planar first end sheet 34, a planar second end sheet 35, and an outlet tube 37. The sheets 30, 32, 33, 34, 35 may cooperate to define an interior volume 36 in which the dust separator 26 and the filter assembly 28 may be disposed. The outlet tube 37 may be integrally formed with or attached to the second back sheet 33 and may be in fluid communication with the interior volume 36 and the air-induction conduit 22 (as shown in FIG. 1).

The U-shaped sheet 30 may be formed at least partially from a metallic material. For example, the U-shaped sheet 30 may be formed from a solid metallic sheet (e.g., chrome-plated or polished stainless steel or aluminum) or from a polymeric sheet coated with a metallic material (e.g., chrome). As particularly shown in FIG. 2, the U-shaped sheet 30 may include a plurality of air inlet openings 38 in communication with the interior volume 36. As particularly shown in FIG. 3, ends 40 of the U-shaped sheet 30 may include channels 42 that receive ends 44 of one or both of the back sheets 32, 33. In some embodiments, the ends 44 of one or both of the back sheets 32, 33 may be fixed within the channels 42 by fasteners 45 (FIG. 2) and/or by a press fit, crimping, welding or any other suitable attachment means.

Figure 4:
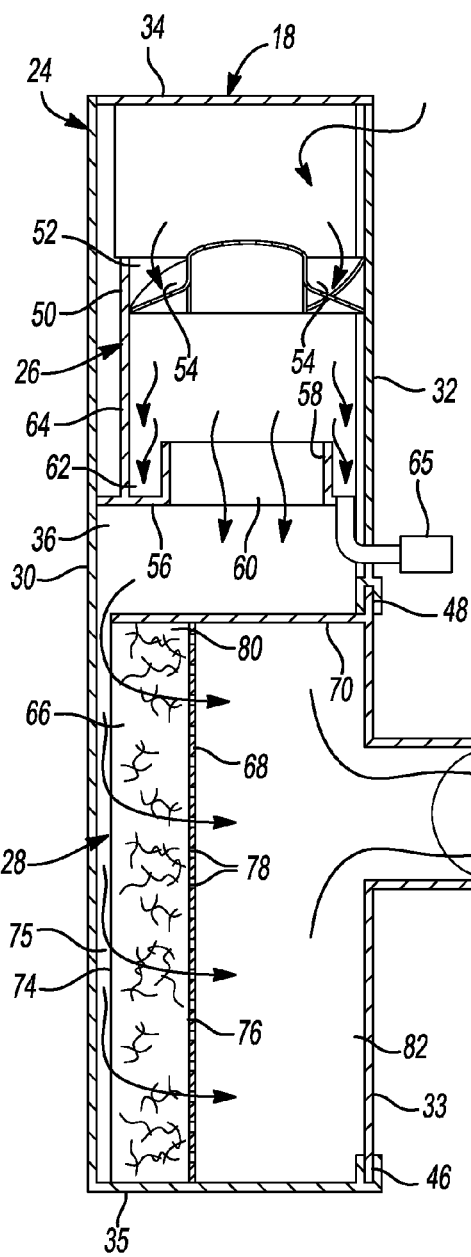
FIG. 4 is a cross-sectional view of the air cleaner taken along line 4-4 of FIG. 2.
Figure 5:
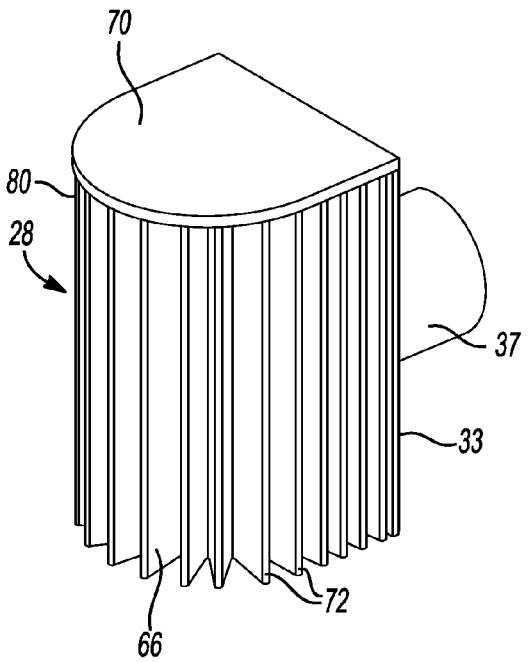
FIG. 5 is a perspective view of a filter assembly of the air cleaner.

One or both of the back sheets 32, 33 and/or one or both of the end sheets 34, 35 may be formed from a polymeric material, for example. As shown in FIG. 4, one or both of the end sheets 34, 35 may include a channel 46 receiving an adjacent one of the back sheets 32, 33. As shown in FIG. 4, the first back sheet 32 may include a channel 48 receiving the second back sheet 33. As described above, the sheets 32, 33 may be fixed with the channels 46, 48 by one or more fasteners, a press fit, crimping, welding and/or any other suitable attachment means. In some embodiments, one or more of the sheets 32, 33, 34, 35 may be integrally formed as a monolithic body with another one or more of the sheets 32, 33, 34, 35. While the sheets 32, 33, 34, 35 are described above as being formed from a polymeric material, in some embodiments, the sheets 32, 33, 34, 35 could be coated with a metallic material and/or formed from a solid metallic material, for example. As shown in FIG. 1, the air cleaner assembly 18 may be mounted to the vehicle 10 such that the back sheets 32, 33 face rearward (i.e., toward a rear end of the vehicle 10).

In the embodiments where the U-shaped sheet 30 is formed from a metallic material (or formed from a polymeric material with a metallic coating), and the sheets 32, 33, 34, 35 are formed from a polymeric material, the metallic sheet 30 provides a desirable appearance for the air cleaner assembly 18 that improves perception of quality. Forming the sheets 32, 33, 34, 35 from a polymeric material may reduce weight and cost, while only minimally impacting the appearance and perception of quality of the air cleaner assembly 18.

The dust separator 26 may include a housing 50 having an annular inlet opening 52. The inlet opening 52 may include a plurality of blades 54 disposed therein. A lower end 56 of the housing 50 may include an annular hub 58 defining an air outlet 60 extending therethrough. An annular recess 62 may be disposed between the hub 58 and a radially outer wall 64 of the housing 50. A discharge valve assembly 65 (shown schematically in FIG. 4) may extend from the annular recess 62 through the first back sheet 32.

The filter assembly 28 may include a filter element 66, a support member 68 and an end cap 70. The filter element 66 may include a bellows construction having a plurality of pleats 72 formed from a paper, a synthetic or natural fiber, and/or a cellulose fiber material, for example, and/or any other suitable material. As shown in FIG. 3, the filter element 66 and the support member 68 may include generally U-shaped cross sections. The curved U-shape of the filter element 66 increases the surface area of the filter element 66 while still allowing the filter element 66 to be housed in a relatively smaller area that a flat filter element having the same surface area. While the filter element 66 is described as being U-shaped, it will be appreciated that the filter element 66 could include any other curved shape.

An upstream side 74 (i.e., a dirty-air side) of the filter element 66 may be spaced apart from the U-shaped sheet 30 of the outer housing 24 to define a gap 75 therebetween. The support member 68 may be attached to and/or disposed adjacent to a downstream side 76 (i.e., a clean-air side) of the filter element 66. The support member 68 may be formed from a relatively rigid polymeric or metallic material, for example, and may include a plurality of apertures 78 extending therethrough. The support member 68 may be attached to or integrally formed with the second back sheet 33.

The end cap 70 may engage an upper axial end 80 of the filter element 66 and may be formed from a relatively rigid polymeric or metallic material, for example. The end cap 70 may be attached to or integrally formed with the second end sheet 33 and/or the support member 68. As shown in FIG. 4, the end cap 70, the support member 68, the second back sheet 33, and the second end sheet 35 may cooperate to define a clean-air chamber 82 in fluid communication with the outlet tube 37.

With continued reference to FIGS. 1-5, operation of the air cleaner assembly 18 will be described. When the engine 16 is running, the engine 16 will draw air through the air cleaner assembly 18 and the air-induction conduit 22. Dirty air from the ambient environment will be drawn into the interior volume 36 of the outer housing 24 through the air inlet openings 38. Before flowing through the filter assembly 28, relatively large dust, dirt and debris particles may be removed from the air in the dust separator 26.

The air may enter the dust separator 26 through the inlet opening 52. The blades 54 may impart a swirling motion to the air flowing through the inlet opening 52 to generate a generally cyclonic air flow path through the dust separator 26. The cyclonic air flow path causes relatively heavy dust, dirt and debris particles in the air to move radially outward relative to the relatively lighter air so that the dust, dirt and debris particles can accumulate in the annular recess 62, while the air flows out of the dust separator 26 through the air outlet 60. The dust, dirt and debris particles may exit the dust separator 26 and the outer housing 24 through the discharge valve assembly 65 that extends through the first back sheet 32.

From the air outlet 60 of the dust separator 26, the air may flow around the end cap 70 to the gap 75 between the U-shaped sheet 30 and the filter element 66. From the gap 75, the air may flow through the filter element 66. The filter element 66 may remove finer dust, dirt and debris particles and/or other impurities from the air as the air flows therethrough. Clean air may exit the filter element 66 and flow into the clean-air chamber 82 through the apertures 78 in the support member 68. From the clean-air chamber 82, the clean air may exit the air cleaner assembly 18 through the outlet tube 37 and flow into the air-induction conduit 22. From the air-induction conduit 22, the clean air may flow into the engine 16 for combustion therein.

Figure 6:
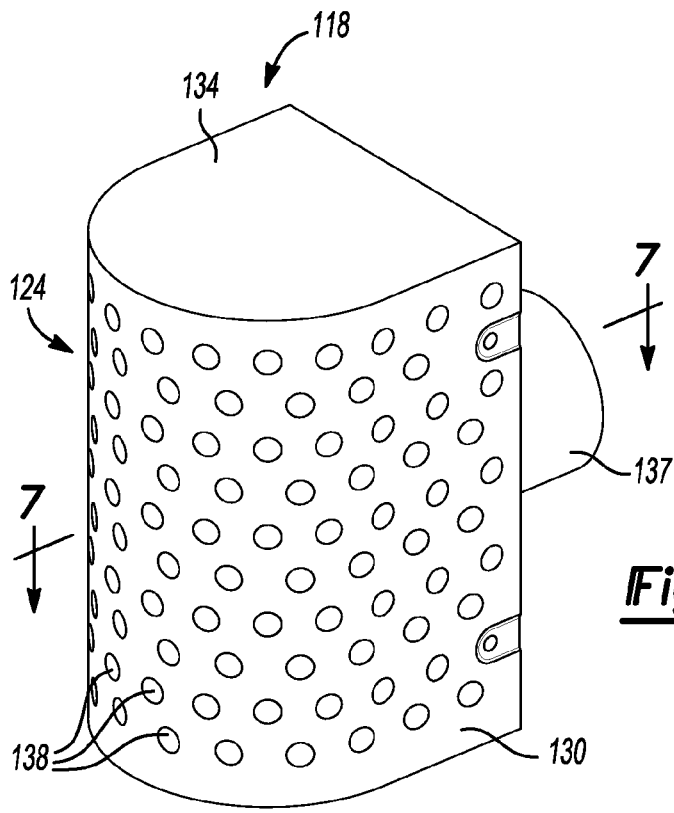
FIG. 6 is a perspective view of another air cleaner according to the principles of the present disclosure.
Figure 7:
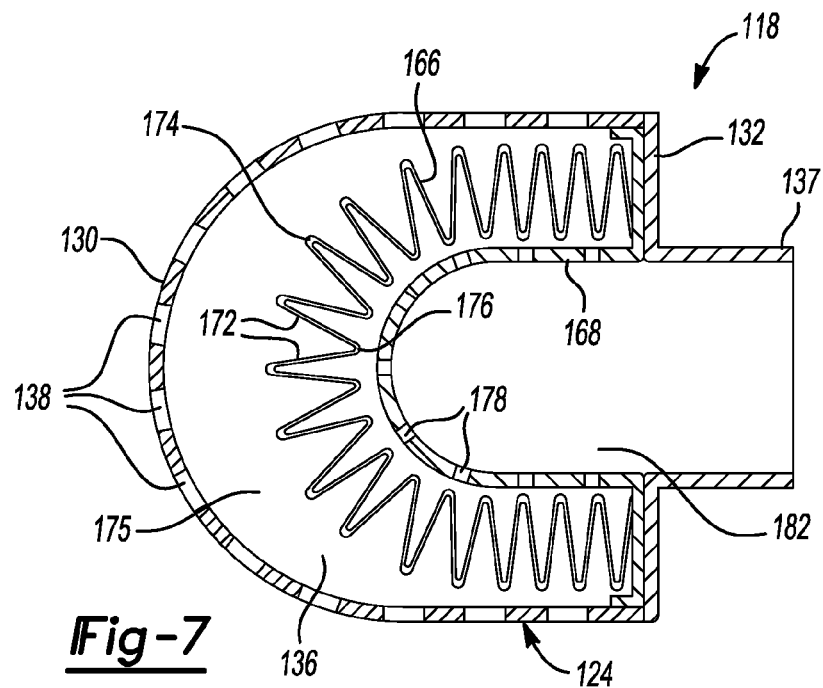
FIG. 7 is a cross-sectional view of the air cleaner of FIG. 6 taken along line 7-7.

With reference to FIGS. 6 and 7, another air cleaner assembly 118 is provided. The air cleaner assembly 118 may be incorporated into the vehicle 10 in place of the air cleaner assembly 18. That is, the air cleaner assembly 118 may be mounted to the exterior surface 20 of the vehicle body 12 and may be fluidly coupled to the air-induction conduit 22 to provide air to combustion chambers (not shown) of the engine 16.

The air cleaner assembly 118 may include an outer housing 124, a filter element 166 and a support member 168. The outer housing 124 may include a curved or generally U-shaped sheet 130, a planar back sheet 132, a pair of planar end sheets 134, and an outlet tube 137. The sheets 130, 132, 134 may cooperate to define an interior volume 136 in which the filter element 166 and support member 168 may be disposed. The outlet tube 137 may be integrally formed with or attached to the back sheet 132 and may be in fluid communication with the interior volume 136 and the air-induction conduit 22.

The U-shaped sheet 130 may be formed at least partially from a metallic material. That is, the U-shaped sheet 130 may be formed from a solid metallic sheet or from a polymeric sheet coated with a metallic material (e.g., chrome). The U-shaped sheet 130 may include a plurality of air inlet apertures 138 in communication with the interior volume 136. The sheets 130, 132, 134 may be attached to each other by any suitable attachment means, such as, for example, by fasteners, press fit, crimping, or welding. In some embodiments, the back sheet 132 and/or one or both of the end sheets 134 may be formed from a polymeric material, for example. In some embodiments, the sheets 132, 134 could be coated with a metallic material and/or formed from a solid metallic material.

Like the filter element 66 described above, the filter element 166 may include a bellows construction having a plurality of pleats 172 formed from a paper, a synthetic or natural fiber, and/or a cellulose fiber material, for example, and/or any other suitable material. As shown in FIG. 7, the filter element 166 and the support member 168 may include be curved and may include generally U-shaped cross sections. An axial height of the filter element 166 may be approximately equal to an axial height of the interior volume 136. An upstream side 174 (i.e., a dirty-air side) of the filter element 166 may be spaced apart from the U-shaped sheet 130 of the outer housing 124 to define a gap 175 therebetween. The support member 168 may be disposed adjacent to a downstream side 176 (i.e., a clean-air side) of the filter element 166. The support member 168 may be formed from a relatively rigid polymeric or metallic material, for example, and may include a plurality of apertures 178 extending therethrough. The back sheet 132, end sheets 134 and the support member 168 may cooperate to define a clean-air chamber 182 in fluid communication with the outlet tube 137.

When the engine 16 is running, the engine 16 will draw air through the air cleaner assembly 118 and the air-induction conduit 22. Dirty air from the ambient environment will be drawn into the interior volume 136 of the outer housing 124 through the air inlet apertures 138. From the gap 175, the air may flow through the filter element 166. The filter element 166 may remove dust, dirt and debris particles and/or other impurities from the air as the air flows therethrough. Clean air may exit the filter element 166 and flow into the clean-air chamber 182 through the apertures 178 in the support member 168. From the clean-air chamber 182, the clean air may exit the air cleaner assembly 118 through the outlet tube 137 and flow into the air-induction conduit 22. From the air-induction conduit 22, the clean air may flow into the engine 16 for combustion therein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air cleaner assembly comprising:
a filter element; and
an outer housing defining an interior volume in which the filter element is disposed,
the outer housing including a curved sheet formed from a metallic material and a planar sheet formed from a polymeric material and extending between ends of the curved sheet,
the curved sheet defining an air inlet of the interior volume, the planar sheet defining an air outlet of the interior volume,
a cyclonic dust separator disposed within the outer housing between the air inlet and the filter element.

2. The air cleaner assembly of claim 1, wherein the filter element includes a U-shaped cross section.

3. The air cleaner assembly of claim 2, wherein the curved sheet includes a U-shaped cross section.

4. The air cleaner assembly of claim 1, further comprising an outlet tube extending from the planar sheet.

5. The air cleaner assembly of claim 1, wherein the air inlet includes a plurality of openings formed in the curved sheet.

6. The air cleaner assembly of claim 1, further comprising a polymeric end sheet that is substantially perpendicular to the curved sheet and the planar sheet and attached to the curved sheet and the planar sheet.

7. The air cleaner assembly of claim 1, further comprising:
a curved support member disposed within the outer housing and supporting the filter element; and
an end cap directly attached to an axial end of the filter element and disposed within the outer housing,
wherein the planar sheet is integrally formed with the curved support member and the end cap.

8. An air cleaner assembly comprising:
a U-shaped filter element; and
an outer housing defining an interior volume in which the filter element is disposed, the outer housing including a U-shaped sheet and a planar sheet extending between ends of the U-shaped sheet, the U-shaped sheet defining an air inlet of the interior volume, the planar sheet defining an air outlet of the interior volume;
wherein the planar sheet is formed from a polymeric material;
wherein the U-shaped sheet is formed from a metallic material;
a polymeric end sheet that is substantially perpendicular to the U-shaped sheet and the planar sheet and attached to the U-shaped sheet and the planar sheet.

9. The air cleaner assembly of claim 8, further comprising a U-shaped support member disposed within the outer housing and supporting the filter element; and
an end cap disposed within the outer housing and directly attached to an axial end of the filter element and an axial end of the support member.

10. The air cleaner assembly of claim 9, wherein the planar sheet is integrally formed with the support member and the end cap.

11. An air cleaner assembly comprising:
a U-shaped filter element; and
an outer housing defining an interior volume in which the filter element is disposed, the outer housing including a U-shaped sheet and a planar sheet extending between ends of the U-shaped sheet, the U-shaped sheet defining an air inlet of the interior volume, the planar sheet defining an air outlet of the interior volume;
a cyclonic dust separator disposed within the outer housing between the air inlet and the filter element.

12. The air cleaner assembly of claim 11, wherein the air inlet includes a plurality of openings formed in the U-shaped sheet.

13. A vehicle comprising:
a vehicle body defining an engine compartment;
an engine disposed within the engine compartment; and
an air cleaner mounted to an exterior of the vehicle body and in fluid communication with the engine, the air cleaner including a U-shaped filter element and an outer housing defining an interior volume in which the filter element is disposed, the outer housing including a U-shaped sheet and a planar polymeric sheet, the U-shaped sheet formed at least partially from a metallic material, the planar polymeric sheet extending between ends of the U-shaped sheet, the U-shaped sheet defining an air inlet of the interior volume, the planar polymeric sheet defining an air outlet fluidly coupled with the engine;
wherein the outer housing includes a polymeric end sheet that is substantially perpendicular relative to the U-shaped sheet and the planar polymeric sheet and attached to U-shaped sheet and the planar polymeric sheet;
wherein the air cleaner includes a U-shaped support member and an end cap, the support member disposed within the outer housing and supporting the filter element, the end cap disposed within the outer housing and directly attached to an axial end of the filter element and an axial end of the support member, wherein the planar polymeric sheet is integrally formed with the support member and the end cap;

wherein the air cleaner includes a U-shaped support member and an end cap, the support member disposed within the outer housing and supporting the filter element, the end cap disposed within the outer housing and directly attached to an axial end of the filter element and an axial end of the support member, wherein the planar polymeric sheet is integrally formed with the support member and the end cap.

14. The vehicle of claim 13, wherein the air cleaner includes a cyclonic dust separator disposed within the outer housing between the air inlet and the filter element.

\* \* \* \* \*